Figure 1:
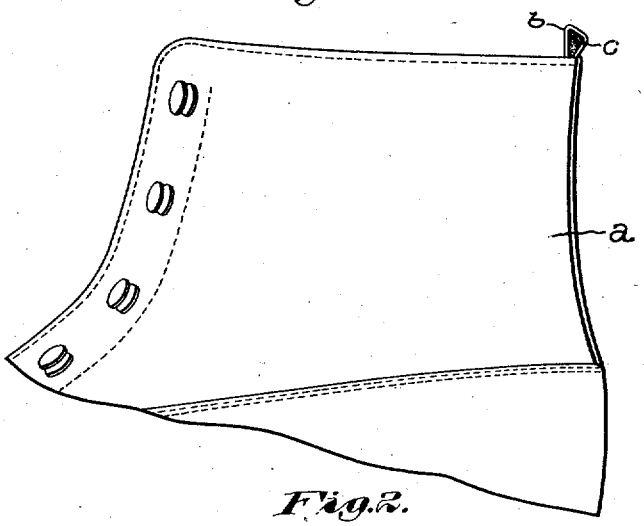

E. C. JACOBS.

BOOT OR SHOE.

APPLICATION FILED FEB. 8, 1913.

Reissued Dec. 22, 1914. 13,852.

*Witnesses:*

Carl L. Choate.

Horace A. Crossman

*Inventor:*

*Ernest C. Jacobs,* by Emery, Booth, Janney and Varney

*Attys.*

NORRIS PETERS CO., PHOTO LITHO., WASHINGTON, D. C

UNITED STATES PATENT OFFICE.

ERNEST C. JACOBS, OF ROCKLAND, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

BOOT OR SHOE.

13,852. Specification of Reissued Letters Patent. Reissued Dec. 22, 1914.

Original No. 1,049,721, dated January 7, 1913. Serial No. 716 654. Application for reissue filed February 8, 1913. Serial No. 747,205.

*To all whom it may concern:*

Be it known that I, ERNEST C. JACOBS, a citizen of the United States, residing in Rockland, county of Plymouth, and State of Massachusetts, have invented an Improvement in Boots or Shoes, of which the following description, in connection with the accompanying drawings, is a specification, like letters on the drawings representing like parts.

This invention relates to boots and shoes and more particularly to a device for pulling the same onto the foot.

Boots and shoes as now commonly constructed are provided with a cloth strap of a length sufficient to form a substantially large loop through which the thumb or finger of the user may be passed to obtain a firm pull upon the boot or shoe. These straps as now constructed project a very considerable distance above the upper edge of the boot or shoe when new, and after being worn are frequently bent down outside of the boot or shoe, and in both instances they are unsightly and objectionable and especially so in high priced shoes.

The present invention has for an object thereof to provide boots or shoes with a pull-on device, which is neat, attractive and highly efficient, which projects above the shoe but a short, if any, distance, and retains its original form after long use. To this end, I now employ and prefer to employ and referring merely to the disclosed embodiment of the invention, a strap, which may be of leather, cloth or other suitable material, and fold the same to form a short loop, which, when secured to the upper, projects but a short distance above the same, and which is provided with a filler, preferably a piece of sole leather or other stiff material. Within the scope or purpose of my invention, the pull-on device may be secured in position otherwise than as shown and otherwise than at the position shown. The filler referred to, may and preferably will be made substantially triangular or wedge-shaped in cross section and of unequal sides, whereby the long side of the triangle may be arranged in the loop of the strap, so that it occupies a substantially vertical position and is presented to the inner side of the shoe, and the shorter sides are presented to the outer side of the shoe and form a projection for the finger to engage and be enabled to exert an upward pull on the shoe. Other suitable shapes of filler may, however, be employed, as my invention is not restricted or limited to any particular shape of filler, it being merely necessary that the pull-on device consist of or have a thick, solid member, the construction and arrangement being such that the member or device, wherever positioned, may be grasped and retained between the thumb and finger in pulling on the boot or shoe. The strap and filler may and preferably will be cemented or otherwise secured together so as to be handled as one piece. These and other features of this invention will be pointed out in the claims at the end of this specification.

Figure 2:
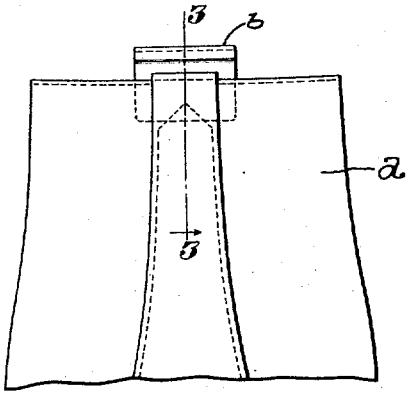
Figure 3:
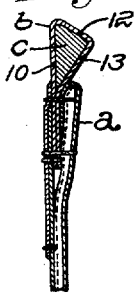

Figure 1 is a side elevation of a sufficient portion of a boot or shoe embodying this invention to enable it to be understood. Fig. 2, a rear elevation of the shoe shown in Fig. 1, and Fig. 3, a section on an enlarged scale taken on the line 3—3, Fig. 2.

Referring merely to the form of my invention shown in the drawing, *a* represents the upper of a boot or shoe of any suitable, desired or ordinary construction. The upper *a* is herein represented as provided with a looped strap or member *b*, which may be stitched or otherwise secured to the inner or outer side of said upper and is made substantially short in length, so that when the said member *b* is secured to the upper, it projects but a slight distance above the same, and forms a loop too small for the passage of the thumb or finger of the hand and therefore not suitable in itself to afford a practical device for pulling on the boot or shoe. To render the said short looped strap *b* serviceable as a pull-on device, I provide a filler *c*, preferably a piece of sole-leather, although other material may be used, which in the disclosed embodiment of the invention fills the loop of the strap. The filler *c* is preferably made substantially triangular or wedge-shaped and is arranged in the loop, so that one of the longer sides 10 is presented to the inner side of the shoe and occupies a substantially vertical position, while the other or shorter sides 12, 13, are presented toward the outer side of the shoe and form a projection for the finger to engage. The filling piece *c* is secured within the looped strap *b* against displacement, preferably by cement, and in practice it is preferred to form the loop and cement the strap to the filler *c* and the two ends of the strap together, before attaching the device to the upper. When the strap *b* is made of leather, it is preferred to skive the ends thin, so that when they are secured together, and to the inner side of the upper, they will not form an objectionable bulge or projection to press unduly against the cord of the ankle.

The device is, in the disclosed embodiment of the invention, attached to the upper so that the apex of the filler piece is substantially on a level with the upper edge of the upper, whereby the filler will not interfere with the projecting portion of the device being bent slightly backward or outward owing to its pliant or flexible and resilient connection to the upper, so as to obtain a firm hold of the device by the user of the shoe.

In practice the pull-on device may be made with the ends of the strap secured together and the filler piece located in the loop above the contacting ends of the strap and cemented or otherwise firmly secured to said strap, so as to be ready to be applied to the upper.

By reference to Fig. 1, it will be observed that the pull-on device herein shown projects but a short distance above the shoe upper and is neat and attractive and does not mar the appearance of the shoe, a thing highly desired in the more expensive shoes.

Having thus described one illustrative embodiment of my invention, I desire it to be understood that although specific terms are employed, they are used in a generic and descriptive sense and not for purposes of limitation, the scope of the invention being set forth in the following claims.

Claims:

1. The combination with the upper of a boot or shoe, of a pull-on device consisting of a strap folded to form a loop, which projects but slightly above the edge of the upper, and a filler located in and filling said loop to enlarge the same and enable the strap to be firmly grasped, substantially as described.

2. The combination with the upper of a boot or shoe, of a pull-on device consisting of a strap folded to form a loop, which projects but slightly above the edge of the upper, and a substantially wedge-shaped filler piece located in and filling said loop with the apex of the wedge near the upper, substantially as described.

3. A pull-on device for boots and shoes consisting of a strap folded and having its lower ends secured together to form a substantially short loop, and a filler piece located in and filling said loop and secured to said strap.

4. A pull-on device for boots and shoes consisting of a leather strap folded and having its lower ends cemented together to form a substantially short loop, and a substantially wedge-shaped filler piece of leather located in and filling said loop and cemented thereto with the apex of the filler adjacent to the contacting ends of the straps.

5. The combination with the upper of a boot or shoe, of a pull-on device consisting of a thick, solid, member secured to and protruding from the upper, said member being shaped to be grasped and retained between the thumb and finger in pulling on the boot or shoe.

6. The combination with the upper of a boot or shoe, of a pull-on device consisting of a comparatively stiff, thick, solid member arranged to be grasped by the thumb and finger, and flexibly attached to the upper.

7. The combination with the upper of a boot or shoe, of a pull-on device consisting of a member having a comparatively stiff, thick, solid portion protruding but slightly above the top of the upper and shaped to be grasped and retained between the thumb and finger in pulling on the boot or shoe, and a lower, relatively thin end secured to the rear portion of the upper, whereby the comparatively stiff portion of said device may be bent with respect to the shoe upper.

8. The combination with the upper of a boot or shoe of a pull-on device consisting of a grip member having an upper, comparatively stiff, thick, solid portion and also having a lower, relatively thin, flexible portion, said device being secured by its said flexible portion to the shoe upper, whereby the said upper portion may be bent with respect to the shoe upper.

9. A pull-on device for boots and shoes consisting of a wedge-shaped core-piece and a covering strip inclosing said core-piece and secured thereto and having its ends extended beyond the core-piece and secured together for attachment to the upper of the boot or shoe.

10. A pull-on device for boots and shoes, consisting of a triangular core-piece having its sides of unequal length, and a covering strip inclosing said core-piece and secured thereto and having its ends extended beyond the apex of the core-piece and secured together for attachment to the upper of the boot or shoe.

In witness whereof, I have signed my name to this specification in the presence of two witnesses.

ERNEST C. JACOBS.

Witnesses:
MICHAEL E. STEWART,
GILES W. HOWLAND.

Copies of this patent may be obtained for five cents each. by addressing the "Commissioner of Patents. Washington, D. C."